United States Patent
Dobry, Jr. et al.

(10) Patent No.: US 6,365,822 B1
(45) Date of Patent: Apr. 2, 2002

(54) POWER SYSTEM HAVING A RADIOISOTOPE HEAT SOURCE

(75) Inventors: Thaddeus J. Dobry, Jr., Lutherville, MD (US); Gerald Walberg, Hampton, VA (US); David Moul, New Freedom, PA (US)

(73) Assignee: Teledyne Energy Systems, Hunt Valley, MD (US)

( * ) Notice: Subject to any disclaimer, the term of this patent is extended or adjusted under 35 U.S.C. 154(b) by 0 days.

(21) Appl. No.: 09/718,334

(22) Filed: Nov. 24, 2000

(51) Int. Cl.$^7$ ............................................... H01L 37/00
(52) U.S. Cl. ...................................................... 136/202
(58) Field of Search .................................. 136/202, 205

(56) References Cited

U.S. PATENT DOCUMENTS

| | | |
|---|---|---|
| 3,570,784 A | 3/1971 | Scheve |
| 3,621,261 A | 11/1971 | Princiotta et al. |
| 3,754,999 A | 8/1973 | Merges |
| 3,790,440 A | 2/1974 | Keshishian |
| 3,894,911 A | 7/1975 | Cooke-Yarborough |
| 3,945,854 A | 3/1976 | Alais |
| 4,001,588 A | 1/1977 | Elsner |
| 4,052,854 A | 10/1977 | Du Pré et al. |
| 4,345,437 A | 8/1982 | Dineen |
| 4,350,012 A | 9/1982 | Folsom et al. |
| 4,387,567 A | 6/1983 | White |
| 4,387,568 A | 6/1983 | Dineen |
| 4,392,351 A | 7/1983 | Doundoulakis |
| 4,408,456 A | 10/1983 | Rauch |
| 4,418,533 A | 12/1983 | Folsom |
| 4,677,825 A | 7/1987 | Fellows |
| 4,715,183 A | 12/1987 | Meijer et al. |
| 4,805,407 A | 2/1989 | Buchanan |
| 4,894,989 A | 1/1990 | Mizuno et al. |

OTHER PUBLICATIONS

Anderson, J., *Hypersonic and High Temperature Gas Dynamics*, McGraw–Hill, 1989, pp. 46–49, No month and/or year provided.

Brauer, G.L., et al., *Capabilities and Applications of the Program to Optimize Simulated Trajectories (Post)*, NASA CR–2770, Feb. 1977, pp. 1–8.

El–Genk, M.S. et al., *Helium Release from $^{238}PuO_2$ Fuel Particles*, Space Technology and Applications International Forum–2000, pp. 1437–1447, No month and/or year provided.

GE Aerospace, *Final Safety Analysis Report for the Ulysses Mission*, vol. II (Book 2), ULS–FSAR0004, 1990, No month and/or year provided.

Sutton, K. et al., *A General Stagnation–Point Convective–Heating Equation for Arbitrary Gas Mixtures*, NASA TR–R376, Nov. 1971, pp. 13 and 40.

Walberg, G., *Analytical Study of Diffusion–Controlled Char Oxidation and its Effect on Steady–State Ablation of Plastic Materials*, NASA TRR–242, Jul. 1996, pp. 1 and 35.

*Primary Examiner*—Bruce F. Bell
*Assistant Examiner*—Thomas H Parsons
(74) *Attorney, Agent, or Firm*—Rosenberg, Klein & Lee (57) ABSTRACT

A power system (10) is provided. System (10) generally comprises at least one generator module (100, 100'), and a heat source (200) encircling at least a portion of the generator module (100, 100'). Each generator module (100) includes at least one generator section (110) having a heat exchanger (120) extending axially therefrom. The heat source (200) is defined by a plurality of separable arcuate aeroshell segments (210, 210') extending angularly about the heat exchanger section (120, 120') of each generator module (100, 100') to collectively describe a substantially cylindrical outer contour coaxially oriented thereabout. Each arcuate aeroshell segment (210, 210') has formed therein at least one fuel compartment (212) extending axially inward from a front axial face (214) thereof in which a radioisotope fuel material (220) is stored and sealed therein by a covering member (230).

20 Claims, 4 Drawing Sheets

POWER SYSTEM HAVING A RADIOISOTOPE HEAT SOURCE

BACKGROUND OF THE INVENTION

1. Field of the Invention

The subject power system is generally directed to an onboard power generation system for a host platform. More specifically, the power system is an onboard system wherein an advanced radioisotope heat source is employed in operating a generator module.

A number of different generator module types, including thermoelectric and thermodynamic generators, are known in the art. A type of generator module available for possible use in space vehicle applications is the Stirling engine/alternator. In this type of generator, a working fluid, such as helium, is contained within a sealed chamber. Sufficient heating of at least a portion of that chamber by an external heat source leads to alternating expansion and compression cycles of the working fluid by which the engine's piston or other actuating member is reciprocally operated.

The technical advantages of a Stirling engine are well-known to those skilled in the art. Perhaps the most notable, at least in space vehicle applications, is its overall efficiency of operation. Compared to thermoelectric-type generators which exhibit an efficiency typically on the order of 7%, known Stirling engine-type generators typically exhibit a level of efficiency on the order of 25%. Consequently, Stirling engine-based generators require less fuel than thermoelectric generators to generate the same power output under comparable conditions. With nuclear systems in particular, a lesser fuel requirement translates rather directly to a lesser safety hazard, and thus yields generally a safer system.

Despite such operational advantages, actual implementation of Stirling engine-based generators in space applications presents substantial challenges not found with other generator types. One such challenge is to effectively achieve an intense transfer of heat from an external heat source to a precisely-defined and narrow annular region of the given Stirling engine generator(s). Unlike thermoelectric generator designs, for example, which afford a widely distributed planar area by which to provide the required heat transfer, Stirling engines require the heat transfer to occur at a highly concentrated heat exchanger header region defined thereon. The challenges are compounded not only by the extreme thermal and mechanical stresses encountered in space flight applications, but by the requirement to safely preserve containment of the heat source's radioisotope fuel material, even when subjected to the environmental extremes encountered during reentry into the Earth's atmosphere. There is, therefore, a need to provide a power system capable of accomplishing the dual function of adequately effecting the necessary transfer of heat to the given power generator and of preserving the given heat source intact during all phases of a given application to safely contain the radioisotope fuel material employed therein, even under the severest of possible conditions.

2. Description of the Related Art

Nuclear power systems are known in the art. Use of such systems to generate onboard power for a host platform are also known in the art, as are the use of those systems in space applications employing Stirling engine-type generators. Such known systems, however, do not adequately provide the combination of capabilities realized by the subject power system.

An approach known in the art is to utilize in a space application employing a Stirling engine generator a heat source designated by the U.S. Department of Energy as the General Purpose Heat Source (GPHS). The GPHS incorporates a rectangular block, or brick-like, fuel-containing structure. One or more GPHS blocks are placed in contact with the heat exchange region(s) of the given Stirling engine(s) to effect the necessary heat transfer. While the solid brick-configuration of the GPHS would enable it to survive reentry, it is far from ideal -at least in this context— in effecting efficient heat transfer.

The GPHS brick configuration forms a solid outer structure that generates high drag when traveling through the atmosphere. This minimizes the structure's velocity during reentry, consequently minimizing the structure's heating during reentry and thereby heightening the likelihood that the structure would survive the reentry cycle. Notwithstanding this, the brick configuration makes for a cumbersome and awkward structure by which to transfer heat to a precisely limited heat exchange region upon a Stirling engine.

It is not an adequate solution to configure the GPHS with a central bore for receiving the heat exchange region of a Stirling engine therein. The resulting configuration would suffer enough compromise in structural strength, weight, and integrity that, absent other more significant additional modifications, the GPHS block in such configuration may very well be left without the ability to survive reentry. Its aerodynamic properties in this configuration may cause the GPHS block to fail, and thereby release its radioisotope fuel material into the atmosphere.

Hence, there remains a need to provide a power system that incorporates a radioisotope heat source capable of effecting highly efficient heat transfer to the given power generator subsystem, yet safely guards against unintended release of its radioisotope fuel material during all conceivable phases of system operation.

SUMMARY OF THE INVENTION

It is a primary object of the present invention, therefore, to provide a power system wherein highly efficient transfer of heat occurs between a radioisotope heat source and a power generator module.

It is another object of the present invention to provide a power system wherein the radioisotope fuel material remains securely contained, even when the system is subjected during use to extreme thermal and mechanical conditions.

It is yet another object of the present invention to provide a power system adapted for space applications.

It is still another object of the present invention to provide a power system wherein a radioisotope heat source capable of both effecting highly efficient heat transfer to a Stirling engine-based generator module and securely containing the radioisotope fuel material held therein even through reentry into the Earth's atmosphere.

These and other objects are attained in the subject power system. The subject power system generally comprises: a generator module and a heat source substantially encircling at least a portion of the generator module in thermally conductive manner. The heat source contains a radioisotope fuel material. The generator module is formed with a heat exchanger section extending axially from a generator section. The heat source is defined by a plurality of separable arcuate aeroshell segments extending angularly about a portion of the generator module's heat exchanger section to collectively encircle it, and to describe coaxially thereabout a substantially cylindrical outer contour. Each arcuate aeroshell segment has formed therein at least one fuel compartment extending axially inward from a front axial face. A covering member is coupled to the front axial face of an arcuate aeroshell segment so as to enclose its fuel compartment.

In one exemplary embodiment of the present invention, the power system comprises: an axially extended housing having a pair of opposed mounting members and an intermediate section extending axially therebetween so as to define an inner chamber. The system also comprises first and second heat engines disposed at least partially within the housing, as well as a substantially annular heat source disposed within the housing inner chamber. The mounting member includes a flange portion defined about a central opening and formed with a plurality of flexure openings that communicate with the inner chamber. Each heat engine includes a generator section and a heat exchanger section extending axially therefrom, wherein at least a portion of each generator section passes through the central opening of one mounting member, and the heat exchanger sections of the first and second heat engines are adjacently disposed. The heat source encircles a portion of each heat exchanger section of the first and second engines for thermally conductive coupling thereto. The heat source is defined by a plurality of separable arcuate segments extending angularly about their respective portions of the heat exchanger sections, with each arcuate segment storing therein a radio-isotope fuel.

DETAILED DESCRIPTION OF THE INVENTION

Figure 1:
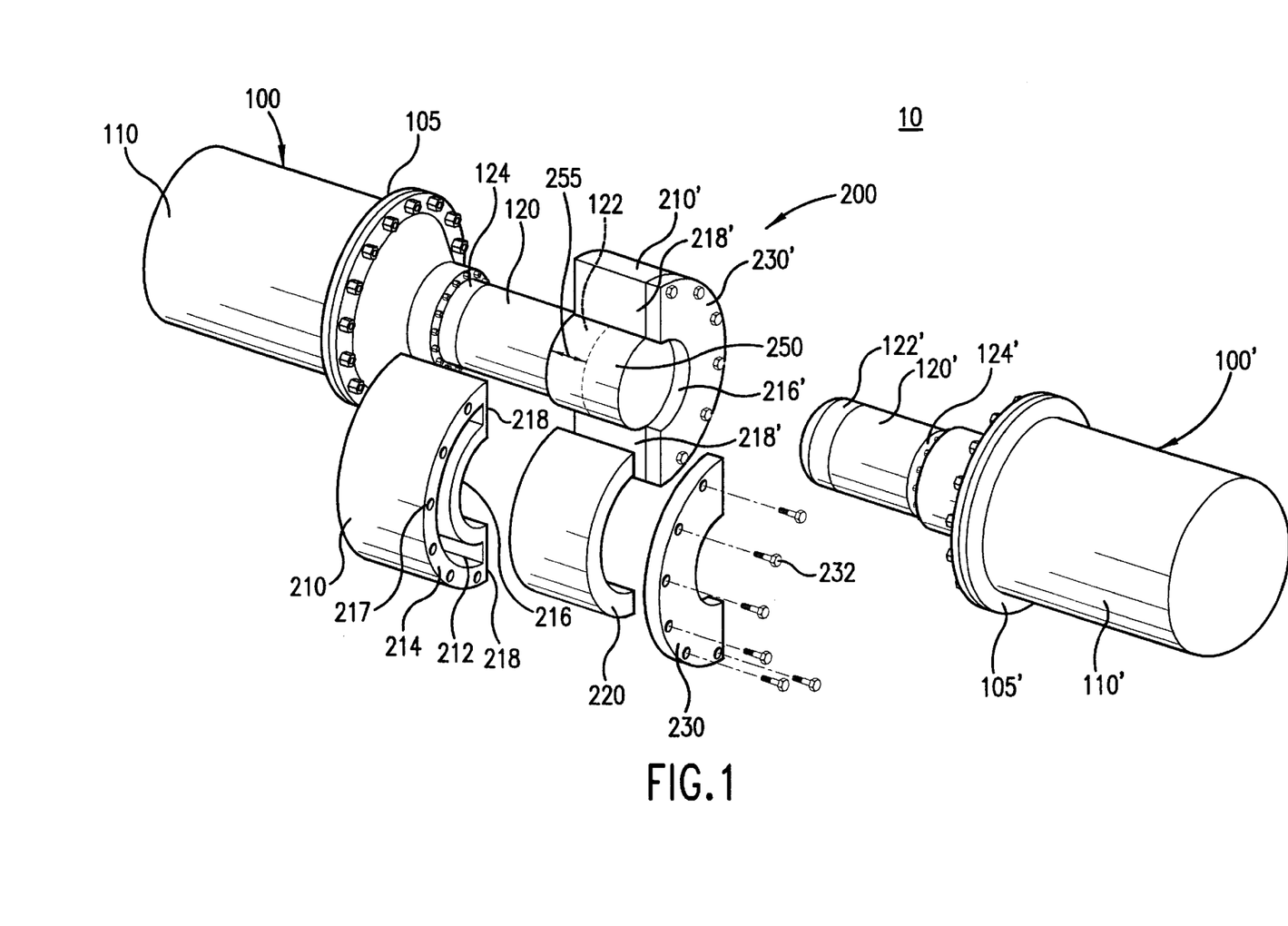
FIG. 1 is an exploded perspective diagram showing one embodiment of the present invention.
Figure 2A:
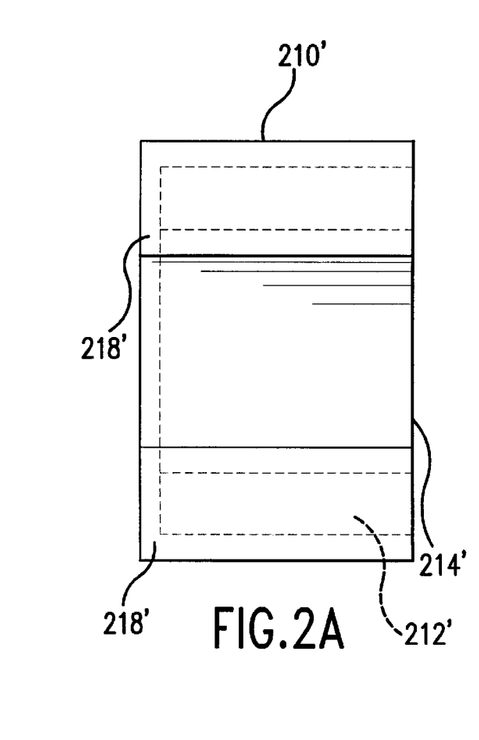
FIG. 2A is an elevational view of a portion of the embodiment shown in FIG. 1.

Referring now to FIGS. 1–2A, there is shown one embodiment of the power system 10 formed in accordance with the present invention. Power system 10 comprises in this embodiment a pair of heat engine generator modules. More specifically, power system 10 employs a pair of Stirling engine generator modules 100, 100' disposed in the mutually opposing arrangement shown. System 10 also comprises a heat source 200 having a plurality of separable arcuate aeroshell assemblies—each including an arcuate aeroshell segment 210, 210'—collectively encircling portions of Stirling engines 100, 100'.

Preferably, heat source 200 includes in addition to arcuate aeroshell segments 210, 210' a substantially tubular sleeve member 250 formed of a thermally conductive material disposed between arcuate aeroshell segments 210, 210' and the adjacent portions of Stirling engines 100, 100' encircled thereby. Each arcuate aeroshell segment 210, 210' has formed therein at least one fuel compartment 212 extending axially inward from a front axial face 214. A radioisotope fuel material 220 is held within fuel compartment 212 and sealed therein by a covering member 230, 230'.

Briefly, power system 10 operates as follows. Each Stirling engine 100, 100' includes a generator section 110, 110' from which a heat exchanger section 120, 120' coaxially extends. In the exemplary Stirling engine configuration shown, each cylindrical heat exchanger section 120, 120' has defined on its outer cylindrical surface, near its terminal end, an annular header region 122, 122'. Each heat exchanger section 120, 120' also has defined thereon an annular base region 124, 124' offset from the header region 122, 122' by a predetermined axial distance. A working fluid such as helium or the like contained within each heat exchanger section 120, 120' alternately expands and compresses to cause a reciprocal displacement of a piston or other such actuation member that drives appropriate transduction of energy within generator section 110, 110'. The required heating is applied by thermal transfer from heat source 200 to the respective header regions 122, 122' of the Stirling engine heat exchanger sections 120, 120' which are fixedly retained within the thermally conductive member 250 each extending axially therein (as indicated for header region 122 by directional arrow 255). The heat thus made available in highly concentrated manner to each Stirling engine heat exchanger section 120, 120' is substantially transferred within that heat exchanger section 120, 120' to fuel the energy conversion occurring therein. In an exemplary application, fuel source 200 transfers heat to each header region 122, 122' at approximately 650° C.; heat thereafter being sufficiently rejected that each base region 124, 124' remains within approximately 80°–100° C. Preferably, heat is transferred away from each base region 124, 124' via any suitable conductive means known in the art.

Each Stirling engine generator, or alternator, 100, 100' is of a design well-known in the art. While other Stirling engine designs and configurations, and indeed other power generator modules of altogether different type may be employed in accordance with the present invention, each generator module 100, 100' is preferably of the type, design, and configuration shown. One such generator module is the 55$W_e$ Technology Demonstration Converter (TDC) fabricated by The Stirling Technology Company of Kennewick, Wash. Again, other suitable generator modules may be employed; however, the TDC exhibits demonstrated efficiencies ranging typically between 25% to 30% for a temperature input of 923° K (650° C.) and a temperature output ranging approximately between 333° K (60° C.) and 393° K (120° C.).

In the embodiment shown, the two Stirling engine modules 100, 100' employed are rigidly connected at the terminal ends of their heat exchanger sections 120, 120'. Several advantages accrue from this configuration. In addition to providing a convenient structure to which heat source 200 may concurrently transfer the required heat, the rigid connection permits the combined support of the heat exchanger sections 120, 120' by a single supporting structure. This reduces the overall system weight—an extremely important factor, particularly in space applications.

The Stirling engine modules' coupling, moreover, enables the cancellation of unwanted mechanical vibrations. Each generator module 100, 100' is characterized by a periodic excitation, typically in the range of 60–80 Hz during operation. Operating the Stirling generators 100, 100' mutually out-of-phase substantially minimizes the residual vibration.

Heat source 200 is employed in accordance with the present invention to concurrently transfer the required heat to the respective heat exchanger sections 120, 120' of the Stirling engine generator modules 100, 100'. Heat source 200 includes a plurality of separable arcuate aeroshell assemblies, each of which forms at its radially innermost portion an arcuate surface that intimately accommodates the portions of the heat exchanger sections 120, 120' passed into the central opening partially defined thereby. The arcuate aeroshell assemblies thus collectively encircle those portions of the heat exchanger sections 120, 120', together describing a substantially continuous structure that coaxially wraps the given heat exchanger section 120, 120' portions to effect highly efficient heating. While the aeroshell assemblies are configured to collectively define a generally cylindrical outer contour, configurational modifications may be incorporated to adjust their aerodynamic properties should the requirements of a given application so dictate.

Each aeroshell assembly preferably includes an arcuate aeroshell segment 210, 210' into which a semi-annular fuel compartment 212, is formed to extend axially inward from front face 214. About the portions of the front axial face 214 bounding the fuel compartment 212 are formed a plurality of fastening holes 217. Once a suitable radioisotope fuel material 220 is placed within fuel compartment 212, the compartment is covered by a suitably-shaped covering member 230 and there fastened by a plurality of fasteners 232 which respectively engage the fastening holes 217 formed into its arcuate aeroshell segment 210.

The particular type of radioisotope fuel material 220 employed is determined by the requirements specific to a given application. Any suitable radioisotope fuel material known in the art may be employed so long as the given requirements permit. One example of such fuel material 220 offering advantages, particularly for space applications, are plutonium polycrystalline fuel kernels fabricated using a sol-gel technique known in the art. A notable feature of this fuel material is that each individual sol-gel particle formed is coated with a thin inner layer (approximately 5 microns) of Pyrolytic Graphite, then with a strong outer layer of zirconium carbide (ZrC), and dispersed in a solid graphite matrix that may be configured into various shapes to conform to fuel compartment 212. This fuel particle structure serves very effectively to contain the helium gas generated by nuclear decay that occurs within the fuel's intragranular voids over time. The fuel is thus capable of remaining intact, without radioisotope release even if the coated fuel particles escape from the heat source enclosure.

An important feature of the present invention is the separability of the individually self-contained aeroshell assemblies. Their separable configuration enables the provision of the central opening (defined collectively by spaces 216, 216') to intimately encircle and thereby optimally transfer heat to the given portions of the Stirling engine generator heat exchanger sections 120, 120'. A central opening simply formed through a unitary structure could cause the heat source's failure should it undergo a reentry cycle. While such non-separable, unitary structure would heighten structural stability, its aerodynamic properties would not be well-suited for a reentry body. Among other things, such heat source structure would be adversely affected thermally. The thermal energy would reach sufficient levels to cause failure, particularly of the structure's inner portions, such that a release of fuel into the atmosphere would likely occur. By splitting the structure into separable, independently self-contained and aerodynamically stable aeroshell assemblies, the thermal energy is caused to distribute along a suitable pattern upon the reentry body surface. Hence, excessive degradation of any structural portion is avoided, preserving the containment of the radioisotope fuel.

Preferably, heat source 200 is formed by a pair of separable semi-annular aeroshell assemblies, as shown. Where the particular requirements of a given application permit, however, other embodiments are conceivable wherein heat source 200 is formed by more than two separable structures that collectively encircle portions of the heat exchanger sections 120, 120'. A factor to be considered in those embodiments, though, is that each additional division of heat source 200 into a greater number of component structures introduces additional end faces 218, 218'. This, in turn, introduces the need for, among other things, additional structural material. This may inflate the overall weight of the resulting structure to a detrimental extent.

The components of each aeroshell assembly may be formed of any material known in the art suitable for the intended application. For the space applications contemplated for the embodiment shown, each of the arcuate aeroshell segments 210, 210' and the covering members 230, 230' are formed of a material having sufficient strength, durability, and material properties to withstand the environmental extremes potentially encountered during all phases of a given space mission, while meeting the weight and other structural constraints imposed by the application. Preferably, each arcuate aeroshell segment 210, 210' and covering member 230, 230' is formed of a fine weave pierced fabric 3-D graphite material. The fasteners 232 may similarly be formed of any material known in the art having properties suitable to the intended application. Other types of fastening means may also be employed, so long as a sufficiently secure fastening of covering member 230, 230' to the arcuate aeroshell segment 210, 210' is effected to seal the fuel material 220 within the fuel compartment.

Figure 2B:
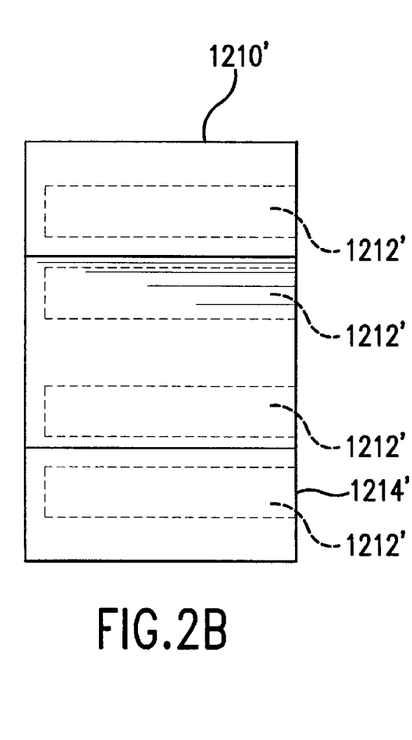
FIG. 2B is an elevational view of the portion shown in FIG. 2A in accordance with an alternate embodiment of the present invention.
Figure 3:
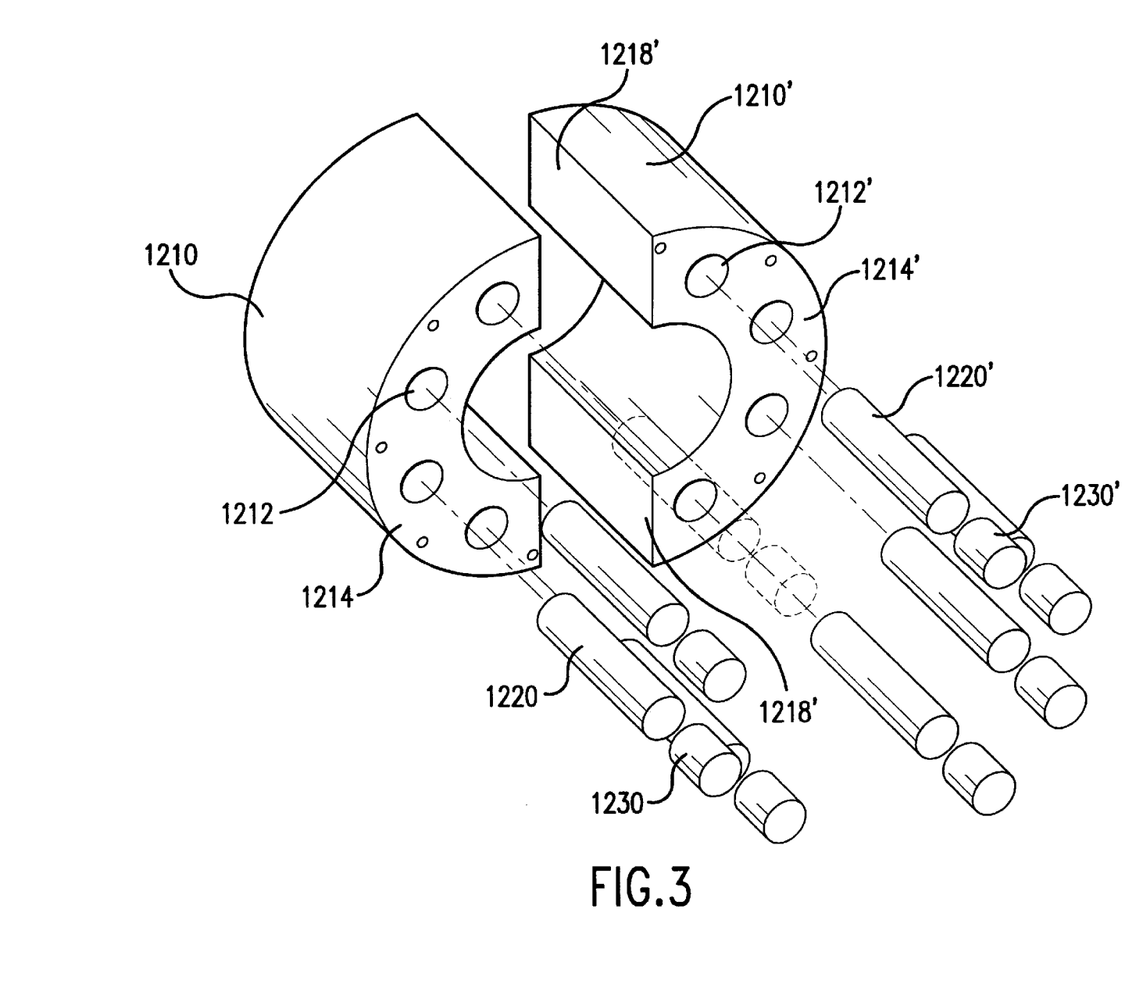
FIG. 3 is an exploded perspective view of a portion of the alternate embodiment of the present invention shown in FIG. 2B.

Turning now to FIGS. 2B–3, an elevational view of one arcuate aeroshell segment 1210' formed in accordance with an alternate embodiment of the present invention is shown in FIG. 2B. Each arcuate aeroshell segment 1210, 1210' in this embodiment is provided with such end faces 1218' configured as in the preceding embodiment, but includes a plurality of separate fuel compartments 1212, 1212' formed therein to extend axially inward from its front axial face 1214, 1214'. Each fuel compartment 1212, 1212' then accommodates radioisotope fuel material configured as a cylindrical fuel pellet 1220, 1220'. The fuel pellets 1220, 1220' are then respectively sealed within their respective fuel compartments 1212, 1212' by a plurality of plug-type covering members 1230, 1230'. Covering members 1230, 1230' may be coupled securely to enclose in sealed manner the corresponding fuel compartments 1212, 1212' by any suitable fastening means.

Figure 4:
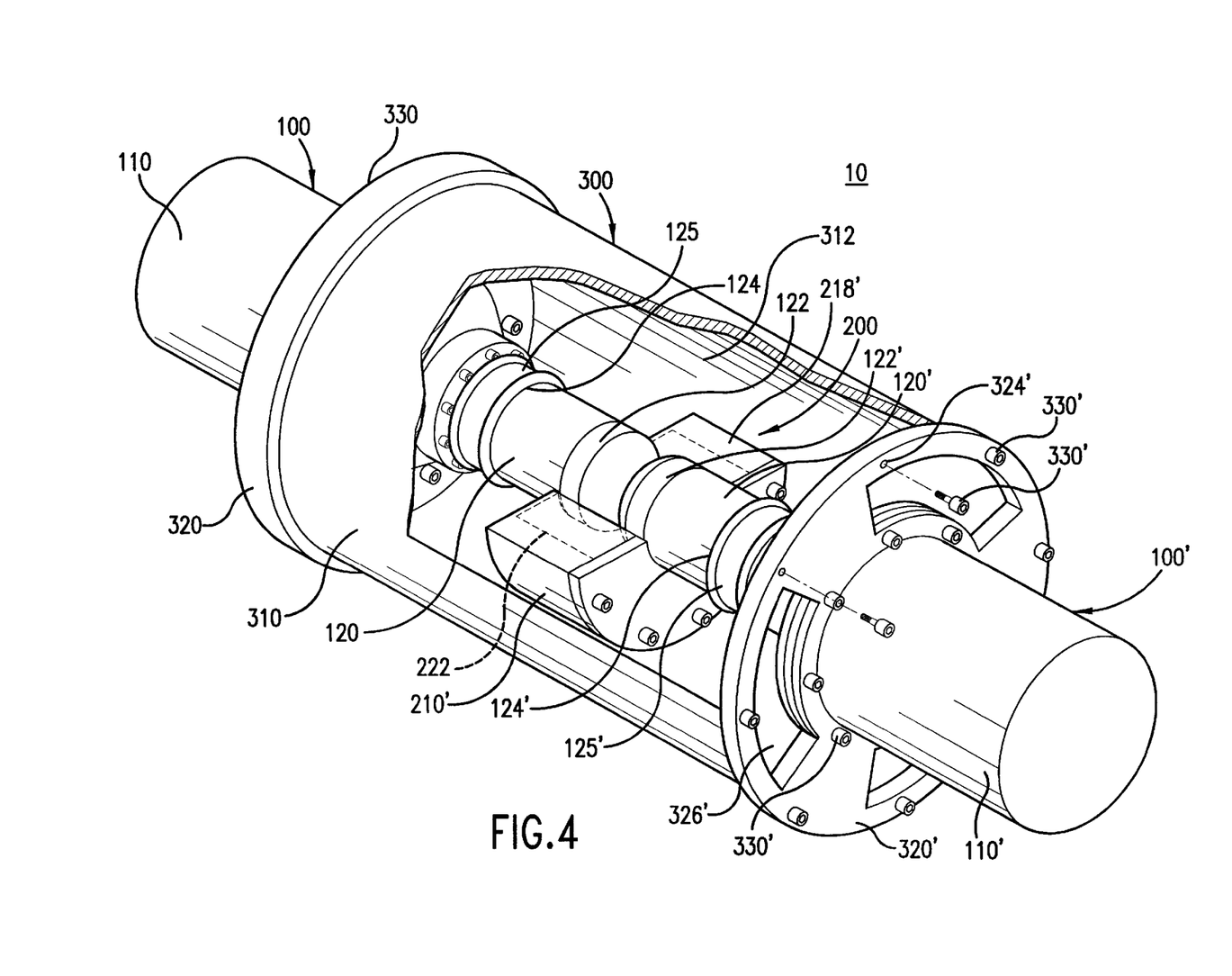
FIG. 4 is a perspective view, partially cut-away, of the embodiment of the present invention shown in FIG. 1, fully assembled; and, FIG. 5 is an elevational view of a portion of the assembly shown in FIG. 4.
Figure 5:
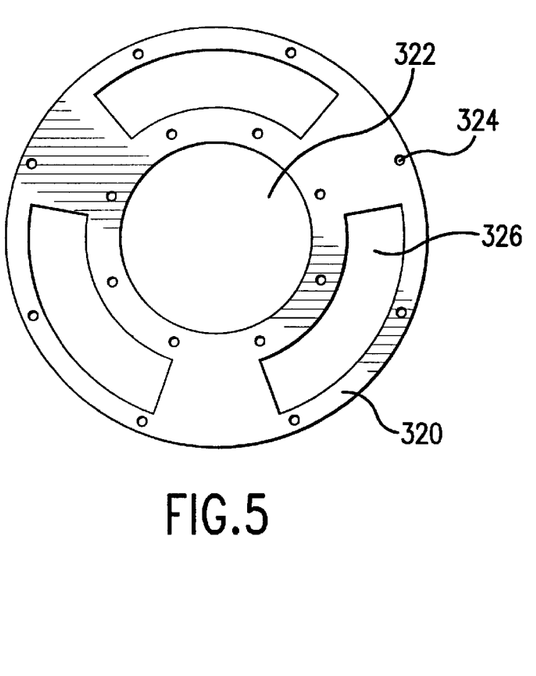

Turning now to FIGS. 4–5, the embodiment of power system 10 of FIG. 1 is shown assembled within a substantially cylindrical housing structure. For the purposes of clarity, the cut-away view of system 10 in FIG. 4 is shown without one of the arcuate aeroshell assemblies, and without the thermally conductive member 250 that are shown in FIG. 1. As indicated by the broken reference lines 222, the fuel material is disposed in each arcuate aeroshell segment 210, 210' to closely surround the annular header regions 122, 122' of the dual Stirling engine generators 100, 100'. These annular header regions 122, 122' are ensleeved by and preferably brazed to the thermally conductive member 250 (FIG. 1). About each annular base region 124, 124' of the respective heat exchanger sections 120, 120' is brazed a thermally conductive ring 125, 125' formed of nickel or other such thermally conductive material. This provides a more conveniently accessible 'port' to which a thermal conductor (not shown) may be coupled in order to direct the residual heat away from the given base region 124, 124'.

Housing assembly 300 includes a substantially cylindrical intermediate section 310, at the axially opposed open ends of which are coupled a pair of mounting members 320, 320'. Each mounting member 320, 320' is fastened to both the intermediate section 310 and the mounting rims 105, 105' (FIG. 1) of the corresponding Stirling engine generator 100, 100' via suitable fastening means 330, 330'. The resulting structure substantially encloses within an inner chamber 312 heat source 200 and a portion of each Stirling engine generator 100, 100'. Preferably, the unoccupied portions of inner chamber 312 are filled with a multilayer foil or other suitable insulating material to minimize heat loss.

Each mounting member 320, 320' is formed with a central opening 322 to accommodate and support the generator section 110, 110' of the corresponding Stirling engine generator 100, 100'. Each mounting member 320 is also formed with a flange portion surrounding central opening 322 in which a plurality of fastener openings 324, 324' are formed for engagement by respective fasteners 330, 330'.

The flange portion of each mounting member 320, 320' is, moreover, formed with a plurality of flexure openings 326, 326' which serve not only to vent the system in the event of any helium release from the radioisotope fuel, but also to provide sufficient flexure in supporting the given Stirling engine generator 100, 100'. The flexure allows for a degree of movement in the otherwise rigidly supported structure—movements due, for instance, to periodic mechanical excitations inhering in the generator's operation, or to the thermal expansion of various structural components. Also, the flexure openings 326, 326' further minimize overall system weight.

Various combinations of shape, orientation, and arrangement of the cut-out flexure openings 326, 326' other than that shown in the exemplary embodiment may be employed in accordance with the present invention. Similarly, different numbers of separate cut-outs may be employed. Their actual number and configuration may be determined based on the particular requirements of the intended application.

Preferably, in the embodiment shown, flexural stiffness is determined based upon a suspended weight of approximately 9.5 kg, and a 60–80 Hz Stirling engine excitation. The intermediate section 310 and each of the mounting members 320, 320' may be formed, again, of any suitable material known in the art capable of withstanding the environmental extremes that may be encountered in the intended application. Preferably, these structural members are formed of a light-weight yet strong material such as Aluminum and the like.

The reentry survivability of heat source 200 was confirmed via computer simulation for various point-mass entry trajectories. In conducting the computer simulation,. aerodynamic heating rates were computed using the stagnation-point heating equation (Sutton 1971) modified to apply to a circular cylinder in cross-flow. The simulation was conducted with the expectation that upon release from the supporting housing structure during reentry, the separable arcuate aeroshell assemblies would, in fact, separate, to form independent reentry bodies each having the semi-annular configuration shown.

While the present invention is not limited to any particular dimensional requirement, each arcuate aeroshell assembly analyzed described an exemplary diameter of 15.24 cm and an exemplary span of 9.32 cm. The simulation confirmed that each arcuate aeroshell assembly, even under the most severe reentry trajectories simulated, remained aerodynamically stable, traveling through the atmosphere with its 7.62-cm radius face forward. Generally, each arcuate aeroshell assembly may be expected to remain aerodynamically stable for expected reentry scenarios; however, the slope of its characteristic pitching moment curve is substantially less at low angles of attack than that typical of known entry vehicles. Each arcuate aeroshell assembly may thus encounter significant oscillations in pitch under certain limited conditions.

The aeroshell assemblies encountered the highest heating rates in the simulation at the highest entry angles (approximately 3500 W/cm$^2$)—at which the heat pulse is relatively short (approximately 8 seconds). The integrated heat load and ablative surface recession in this case were found to be relatively low, at approximately 11 kJ/cm$^2$ and 0.1 cm, respectively.

At the lowest entry angles examined, the arcuate aeroshell assemblies underwent a skip entry whereby each assembly initially enters the atmosphere, skips back out, coasts at a relatively stable altitude, then re-enters the atmosphere. Each arcuate aeroshell assembly encountered two heat pulses in this case, thus encountering two periods of significant ablation. While the peak-heating rate was found for this case to be a substantially lower 548 W/cm$^2$, the integrated heat load was found to be a significantly higher 104 kW/cm$^2$. This yielded a worst case ablative recession about the portions of each arcuate aeroshell assembly closest to the fuel compartment of approximately 0.356 cm, or approximately 62% of the original 0.57 cm graphite wall thickness employed.

Although this invention has been described in connection with specific forms and embodiments thereof, it will be appreciated that various modifications other than those discussed above may be resorted to without departing from the spirit or scope of the invention. For example, elements may be substituted for those specifically shown and described, certain features may be used independently of other features, and in certain cases, the number of actual components or modules shown may be varied, all without departing from the spirit or scope of the invention.

What is claimed is:

1. A power generation system comprising:
   (a) an axially extended housing having a pair of opposed mounting members and an intermediate section extending axially therebetween to define an inner chamber, each said mounting member including a flange portion defined about a central opening, said flange portion having a plurality of flexure openings formed therein, said flexure openings being in open communication with said inner chamber;
   (b) first and second heat engines disposed at least partially within said housing, each said engine including a generator section and a heat exchanger section extending axially therefrom, at least a portion of each said generator section passing through said central opening of one said mounting member, said heat exchanger sections being adjacently disposed; and,
   (c) a substantially annular heat source disposed within said housing inner chamber encircling a portion of each said first and second engine heat exchanger section for thermally conductive coupling thereto, said heat source being defined by a plurality of separable arcuate aeroshell segments extending angularly about said portions of said heat exchanger sections, each said arcuate aeroshell segment storing therein a radioisotope fuel.

2. The power generation system as recited in claim 1 further comprising a substantially tubular thermally conductive member coupled between said heating source and said portions of said first and second engine heat exchanger sections.

3. The power generation system as recited in claim 1 further comprising a multilayer foil thermal insulation material substantially filling said housing inner chamber about said engines and said heat source.

4. The power generation system as recited in claim 1 wherein said heat source includes a pair of said arcuate aeroshell segments each having a semi-cylindrical outer contour.

5. The power generation system as recited in claim 4 wherein each said arcuate aeroshell segment has formed therein a semi-annular fuel compartment extending axially from a front axial face thereof for storing said radioisotope fuel, each said arcuate aeroshell segment including a face plate coupled to said front axial face thereof for enclosing said fuel compartment.

6. The power generation system as recited in claim 1 wherein each said arcuate aeroshell segment has formed therein a plurality of axially extended compartments for respectively receiving a plurality of substantially cylindrical radioisotope fuel pellets.

7. The power generation system as recited in claim 1 wherein said heat exchange sections of said first and second engines are disposed one coaxially opposing the other, each said heat exchange section having defined thereon axially spaced header and base annular regions.

8. The power generation system as recited in claim 7 further comprising a thermally conductive band brazed on said base region of each said first and second engine heat exchanger section.

9. A power generation system comprising:
(a) an axially extended housing having a pair of opposed mounting members and an intermediate section extending axially therebetween to define an inner chamber, each said mounting member including a flange portion defined about a central opening, said flange portion having a plurality of flexure openings formed therein, said flexure openings being in open communication with said inner chamber;
(b) first and second Stirling engines disposed at least partially within said housing, each said engine including a generator section and a heat exchanger section extending axially therefrom, at least a portion of each said generator section passing through said central opening of one said mounting member, said heat exchanger sections being disposed one coaxially opposing the other;
(c) a substantially tubular thermally conductive member coaxially coupled to portions of each said first and second engine heat exchanger section;
(d) a heat source coaxially encircling said thermally conductive member, said heat source being defined by a plurality of separable arcuate aeroshell segments extending angularly about said portions of said heat exchanger sections, each said arcuate aeroshell segment storing therein a radioisotope fuel; and,
(e) a thermal insulation material substantially filling said housing inner chamber about said engines and said heat source.

10. The power generation system as recited in claim 9 wherein said heat source includes a pair of said arcuate aeroshell segments each having a semi-cylindrical outer contour.

11. The power generation system as recited in claim 10 wherein each said arcuate aeroshell segment has formed therein a semi-annular fuel compartment extending axially inward from a front axial face thereof for storing said radioisotope fuel, each said arcuate aeroshell segment including a face plate coupled to said front axial face thereof for sealing said fuel compartment.

12. The power generation system as recited in claim 9 wherein each said arcuate aeroshell segment has formed therein a plurality of axially extended compartments for respectively receiving a plurality of substantially cylindrical radioisotope fuel pellets.

13. The power generation system as recited in claim 9 further comprising a thermally conductive band brazed on said base region of each said first and second engine heat exchanger section.

14. A heat source for a dual-Stirling engine power generation system comprising:
(a) a substantially tubular thermally conductive member for coaxially coupling to heat exchanger sections of the Stirling engines;
(b) a plurality of separable arcuate aeroshell segments engaging said thermally conductive member, said arcuate aeroshell segments collectively encircling said thermally conductive member to describe a substantially cylindrical outer contour coaxially disposed thereabout, each said arcuate aeroshell segment having formed therein at least one fuel compartment extending axially inward from a front axial face thereof;
(c) a radioisotope fuel stored in said fuel compartment of each said arcuate aeroshell segment; and,
(d) a covering member coupled to said front axial face of each said arcuate aeroshell segment for sealing said fuel compartment thereof.

15. The heat source as recited in claim 14 comprising a pair of said arcuate aeroshell segments each having a semi-cylindrical outer contour.

16. The heat source as recited in claim 15 wherein each said fuel compartment of said arcuate aeroshell segment has formed with a semi-annular contour, and each said covering member includes a semi-annular face plate coupled to said front axial face thereof for sealing said fuel compartment.

17. The heat source as recited in claim 16 wherein each said arcuate aeroshell segment is formed of a graphite material, and said thermally conductive member is formed of a nickel material.

18. The heat source as recited in claim 14 wherein each said arcuate aeroshell segment has formed therein a plurality of said fuel compartments, said fuel compartments respectively receiving a plurality of substantially cylindrical radioisotope fuel pellets.

19. The heat source as recited in claim 18 wherein each said arcuate aeroshell segment includes a plurality of plug members for respectively sealing said fuel compartments thereof.

20. A power generation system comprising:

(a) a generator module including at least one generator section having a heat exchanger section extending axially therefrom; and, (b) a heat source encircling at least a portion of said heat exchanger section for thermally conductive coupling thereto, said heat source being defined by a plurality of separable arcuate aeroshell segments extending angularly about said portion of said heat exchanger section to collectively describe a substantially cylindrical outer contour coaxially oriented thereabout, each said arcuate aeroshell segment having formed therein at least one fuel compartment extending axially inward from a front axial face thereof;

(c) a radioisotope fuel stored in said fuel compartment of each said arcuate aeroshell segment; and, (d) a covering member coupled to said front axial face of each said arcuate aeroshell segment for sealing said fuel compartment thereof.

* * * * *